(12) United States Patent
Bosselmann et al.

(10) Patent No.: US 7,517,143 B2
(45) Date of Patent: Apr. 14, 2009

(54) METHOD FOR DETERMINING THE TEMPERATURE OF A SURFACE COATING

(75) Inventors: Thomas Bosselmann, Marloffstein (DE); Klaus Huber, Effeltrich (DE); Francisco Javier Sevilla Perez, Barcelona (ES); Michael Willsch, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 175 days.

(21) Appl. No.: 11/665,824

(22) PCT Filed: Oct. 11, 2005

(86) PCT No.: PCT/EP2005/055141

§ 371 (c)(1),
(2), (4) Date: Apr. 19, 2007

(87) PCT Pub. No.: WO2006/042807

PCT Pub. Date: Apr. 27, 2006

(65) Prior Publication Data

US 2008/0159353 A1   Jul. 3, 2008

(30) Foreign Application Priority Data

Oct. 19, 2004   (DE) .................... 10 2004 050 906

(51) Int. Cl.
*G01K 11/00*   (2006.01)
(52) U.S. Cl. ..................................... 374/120
(58) Field of Classification Search ............ 374/117, 374/120, 121
See application file for complete search history.

(56) References Cited

U.S. PATENT DOCUMENTS

| 4,235,107 | A | 11/1980 | Lüdeke et al. |
| 4,568,200 | A | 2/1986 | Hatono et al. |
| 5,479,826 | A * | 1/1996 | Twerdochlib et al. .......... 73/660 |
| 6,974,641 | B1 | 12/2005 | Choy et al. |
| 2004/0166339 | A1 | 8/2004 | Srivastava et al. |
| 2006/0048581 | A1* | 3/2006 | Bosselmann et al. .......... 73/781 |
| 2008/0175300 | A1* | 7/2008 | Billington et al. ........... 374/117 |

FOREIGN PATENT DOCUMENTS

| DE | 32 46 294 A1 | 6/1983 |
| DE | 28 03 480 C2 | 11/1984 |
| EP | 1 105 550 B1 | 6/2001 |
| GB | 2 109 472 A | 6/1983 |
| WO | WO 01/67057 A1 | 9/2001 |

* cited by examiner

*Primary Examiner*—Andre J Allen

(57) ABSTRACT

The invention relates to a method for determining the temperature of a surface coating of rotating blades mounted in a non-positive-displacement machine with a rotor shaft rotationally mounted in a housing, during which electromagnetic waves are emitted in a duct in an area of the rotating blades by at least one means for generating electromagnetic waves. The electromagnetic waves are reflected, at least in part, by at least one rotating blade. The reflected portions of the electromagnetic waves are received by at least one receiving means and the temperature of the surface coating of the rotating blades is determined from a distribution of intensity of the received electromagnetic waves. The invention also relates to a method for determining the temperature of a surface coating of guide vanes mounted in a rotationally fixed manner in a non-positive-displacement machine with a housing, and to a device for carrying out the method.

16 Claims, 4 Drawing Sheets

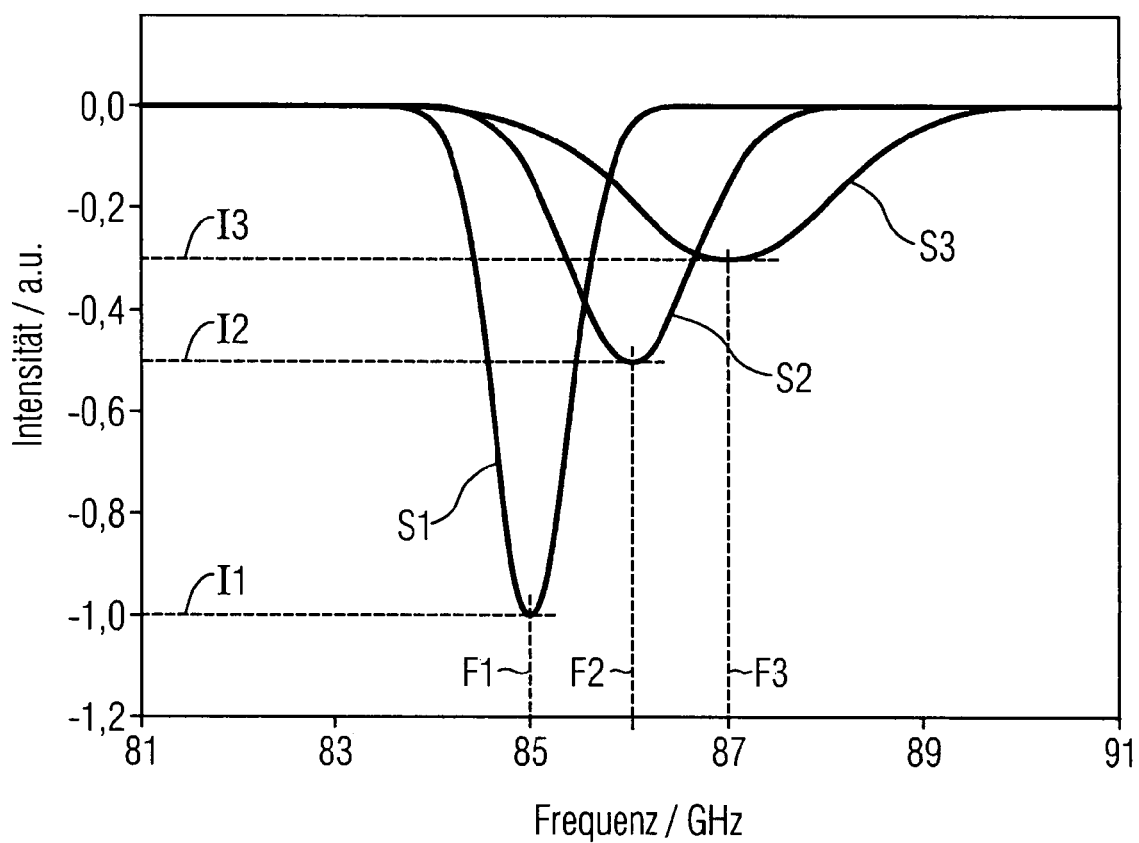

METHOD FOR DETERMINING THE TEMPERATURE OF A SURFACE COATING

CROSS REFERENCE TO RELATED APPLICATIONS

This application is the US National Stage of International Application No. PCT/EP2005/055141, filed Oct. 11, 2005 and claims the benefit thereof. The International Application claims the benefits of German application No. 10 2004 050 906.9 filed Oct. 19, 2004, both of the applications are incorporated by reference herein in their entirety.

FIELD OF INVENTION

The present invention relates to a method for determining the temperature of a surface coating of rotating blades arranged in a non-positive-displacement machine on a rotor shaft rotationally mounted in a housing. The invention also relates to a method for determining the temperature of a surface coating of guide vanes arranged in a rotationally fixed manner in a non-positive-displacement machine with a housing, and to a device for carrying out the method.

BACKGROUND OF THE INVENTION

Non-positive-displacement machines such as, for example, steam or gas turbines, are employed as heat engines in engineering in order to convert an energy stored in a gas flow into a mechanical energy, in particular into a rotary motion. In order to increase the efficiency of such machines, increasingly high physical demands are being placed on the materials used in the non-positive-displacement machine. So, to increase the efficiency of a gas turbine, the temperature of a gas flow flowing into the gas turbine is raised to more than 1200° C. In order to be able to withstand the high physical demands, in particular due to the temperature, the blades of the turbine are equipped with a coating which will withstand a particularly high loading. Such a coating is, for example, the thermal barrier coating of blades of a gas turbine, hereinafter referred to as TBC, a blade being furnished on its surface exposed to the gas flow with a coating of this type. Yttrium-stabilized zirconium oxide, for example, can be considered as a coating. Due to the temperature-dependence of the efficiency, it is desirable for the temperature of the gas flow to be increased up to a maximum threshold value without the TBC being damaged. For this purpose, measurement methods and devices are required for determining the exact temperature of the blade surfaces and in particular of the blade surface coatings during operation of the non-positive-displacement machine.

A common option for determining the temperature is the attachment of thermoelements to the points to be examined. Due to the high temperatures in the gas flow of the non-positive-displacement machine, the thermoelements generally fail after a few hours of operating time and are in most cases destroyed.

A contactless alternative to thermoelements is presented by optical pyrometers, by means of which the temperature of the object can be inferred in an optical manner from the radiation radiated by the hot object under examination. A corresponding pyrometer is indicated in GB 2 109 472 A. Since the radiation pattern and thus the emission coefficient of TBC has been studied relatively little and is consequently not known precisely, only a relatively imprecise temperature measurement can be undertaken herewith.

SUMMARY OF INVENTION

The object of the present invention is therefore to provide a method and a device for carrying out the method, by means of which the temperature of the surface coating of rotating blades and/or guide vanes can be determined in as simple, reliable and accurate a manner as possible.

As a solution for achieving the object the invention proposes a method for determining the temperature of a surface coating of rotating blades arranged in a non-positive-displacement machine on a rotor shaft rotationally mounted in a housing, wherein electromagnetic waves are emitted in a duct in an area of the rotating blades by at least one means for generating electromagnetic waves, the electromagnetic waves are reflected at least in part by at least one rotating blade, the reflected portions of the electromagnetic waves are received by at least one receiving means and the temperature of the surface coating of the rotating blades is determined from a distribution of intensity of the received electromagnetic waves.

The fact is exploited here that the reflected portion of the electromagnetic waves emitted contains in its spectral intensity distribution information about the temperature of the surface coating, which information can be determined by evaluating the reflected electromagnetic waves. Eligible as parameters for this purpose are, in particular, the amplitude or intensity and/or frequency or wavelength.

The invention proposes furthermore a method for determining the temperature of a surface coating of guide vanes arranged in a rotationally fixed manner in a non-positive-displacement machine with a housing, wherein electromagnetic waves are emitted in a duct in an area of the guide vanes by at least one means for generating electromagnetic waves, the electromagnetic waves are reflected at least in part by at least one guide vane, the reflected portions of the electromagnetic waves are received by at least one receiving means and the temperature of the surface coating of the guide vanes is determined from a distribution of intensity of the received electromagnetic waves.

In addition, a combination of the two methods above is proposed in order to determine the temperature of the surface coating of the rotating blades as well as the temperature of the surface coating of the guide vanes.

It is advantageous here for the electromagnetic waves to be emitted with frequencies adapted to the thickness of the surface coating, the received electromagnetic waves exhibiting a decrease in intensity at a resonance frequency and the intensity distribution being minimal at the resonance frequency. In this case the electromagnetic waves should be emitted over a wide frequency band with equal intensity so that the minimum and the resonance frequency can be determined all the more accurately. The surface coating exhibits namely for electromagnetic waves of a narrow frequency range around a so-called resonance frequency a particularly low reflectivity so that the spectral intensity distribution of the reflected electromagnetic waves exhibits a dip at the resonance frequency, the resonance frequency representing the minimum. This is attributable to the fact that, at the resonance frequency, the associated wavelength of the emitted electromagnetic wave is precisely four times as large as the thickness of the surface coating so that the portions of the emitted electromagnetic wave reflected at the surface of the coating and at the interface of coating and underlying metal obliterate one another at least in part.

Advantageously, the temperature of the surface coating of the blades can thus be determined from the amount of the intensity decrease. Advantageously, the temperature of the surface coating of the blades can also be determined from the amount of the resonance frequency. Since the intensity decrease and also the resonance frequency are temperature-dependant, a determination of at least one of the two variables returns the desired temperature information directly. Both the change in the intensity decrease and the change in the resonance frequency can be attributed to a change in the dielectric constant and/or to a change in the layer thickness of the surface coating as a function of the temperature of the surface coating.

It can be provided that the at least one means for generating the electromagnetic waves is used for receiving the reflected electromagnetic waves. The space saving thereby obtained enables the attachment of multiple combined transceiver means at various points of the non-positive-displacement machine. So, for example, means for the transmitting and receiving of the electromagnetic waves can be used, said means being arranged in a distributed manner over the circumference of the non-positive-displacement machine, it being possible for an arrangement to be provided according to requirements.

It is also proposed that millimeter waves, in particular in the frequency range from 10 GHz to 130 GHz, be used as electromagnetic waves. For electromagnetic waves of this frequency have a wavelength of the order of magnitude of the layer thickness of the surface coating, so that a particularly good obliteration of the portions of the emitted electromagnetic wave reflected at the surface of the coating and at the interface of coating and underlying metal is ensured.

The invention also proposes a device for implementing the method according to the invention, comprising at least one means for generating an electric oscillation, at least one means for generating electromagnetic waves from the oscillation, at least one means for receiving electromagnetic waves and an evaluation unit for evaluating the receivable electromagnetic waves.

Advantageously, the at least one means for generating the electromagnetic waves and the at least one means for receiving the reflected electromagnetic waves are arranged in a duct of the non-positive-displacement machine. These means can be formed respectively by antennae that are suitable for generating and emitting or receiving electromagnetic millimeter waves. The means for generating an electric oscillation can be formed, for example, by an electronic oscillator that is operatively connected with the antenna for generating the electromagnetic waves. The means for receiving electromagnetic waves is preferably operatively connected with an evaluation unit which is capable of determining the temperature of the surface coating of the blades from signals returned by the receiving means. It is additionally conceivable for the at least one means for generating the electromagnetic waves and the at least one means for receiving the reflected electromagnetic waves to be arranged outside the duct of the non-positive-displacement machine, and for the generated electromagnetic waves to be emitted into the duct via at least one appropriately positioned waveguide arranged in the duct of the non-positive-displacement machine and for the electromagnetic waves reflected on the blades also to be guided via at least one waveguide to the at least one receiving means.

It is advantageous here for the electromagnetic waves to be emitted by means of the at least one antenna in a directed and/or focused manner. This ensures a targeted temperature measurement. In addition, a spatial resolution of the temperature measurement on the blades can be enabled if the antenna is also fashioned such that translations and/or rotations of the antenna are possible.

It is proposed furthermore that the at least one means for generating electromagnetic waves is suitable both for transmitting and for receiving electromagnetic waves. The number of components can in this way be further reduced. So, for example, the at least one means for generating electromagnetic waves can be operatively connected via a coupling means to the means for generating an oscillation. The signals which can be traced back to the received electromagnetic waves are fed via the coupling means to the evaluation unit. Provision can also be made for multiple coupling means and antennae which, for example, are connected in parallel with multiple associated evaluation units or else with, for example, one evaluation unit in time-division multiplex.

The non-positive-displacement machine is advantageously a gas turbine. It is precisely in the field of heavy machinery that the device according to the invention can achieve a simple, reliable and accurate determination of the temperature of the surface coating of the gas turbine blades, whereby a more effective operation can be ensured and in particular costly downtimes due to maintenance and repair measures because of destroyed surface coatings and blades can be further reduced. For example, an increase in the availability of a power supply equipped with a gas turbine can be achieved in this manner. The device according to the invention can, in addition, be configured such that the impact on the gas flow in the duct of the non-positive-displacement machine is largely minimized.

BRIEF DESCRIPTION OF THE DRAWINGS

Preferred, but in no way restrictive, exemplary embodiments of the invention will now be explained in detail with the aid of the drawings. For clarity, the drawings are not executed to scale, and certain features are represented only schematically. In detail:

FIG. 6 shows a spectral intensity distribution of reflected electromagnetic waves for different temperatures of the surface coating and FIG. 7 shows an antenna arrangement for the monitoring of guide vanes and/or rotating blades.

Parts corresponding to one another in FIGS. 1 to 7 are labeled with the same reference characters.

DETAILED DESCRIPTION OF INVENTION

Figure 1:
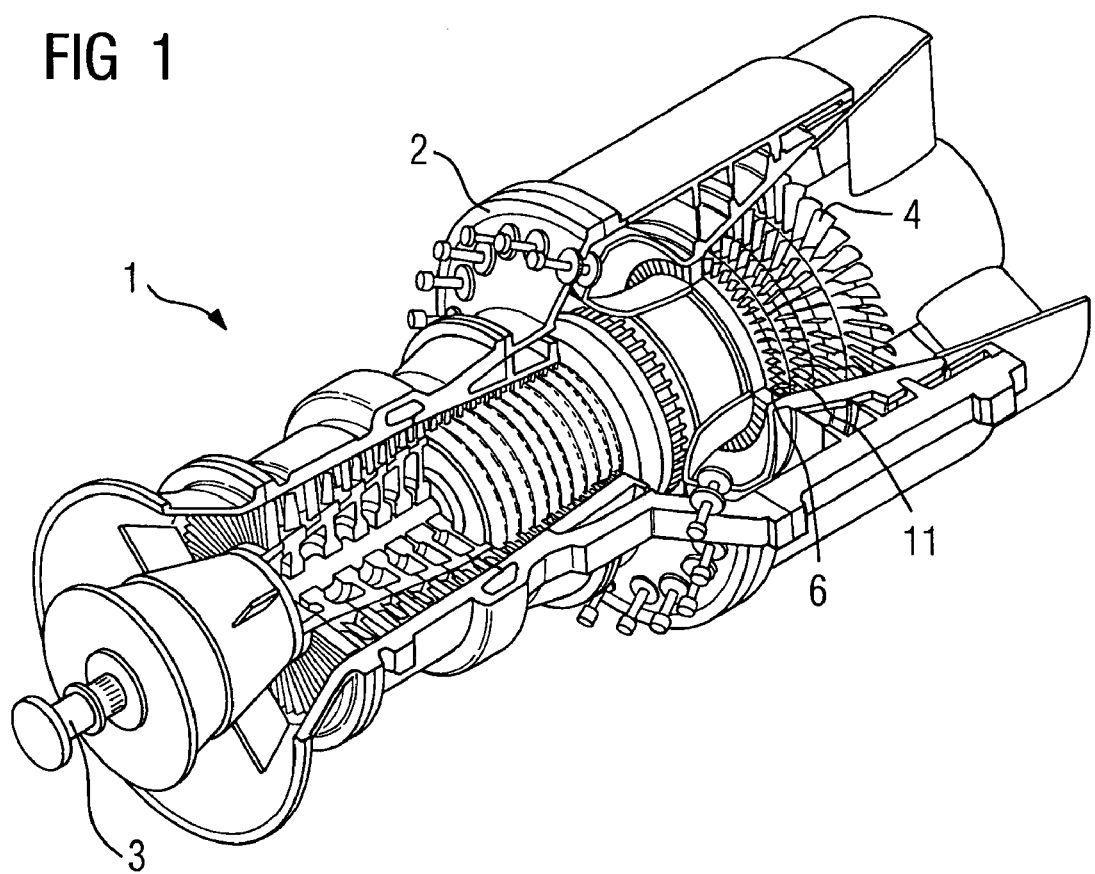
FIG. 1 shows a gas turbine of the prior art in a partially open, perspective view.
Figure 4:
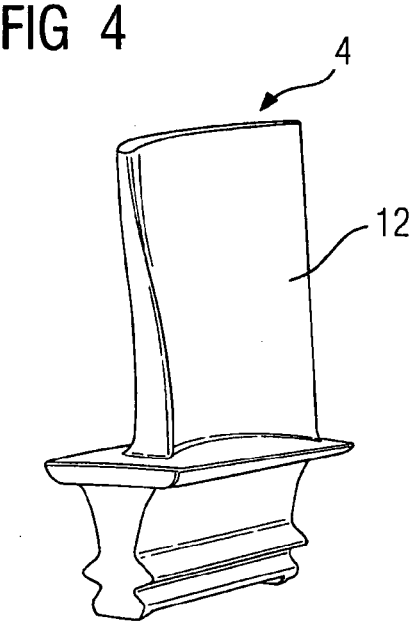
FIG. 4 shows a rotating blade of the gas turbine in FIG. 1.
Figure 5:
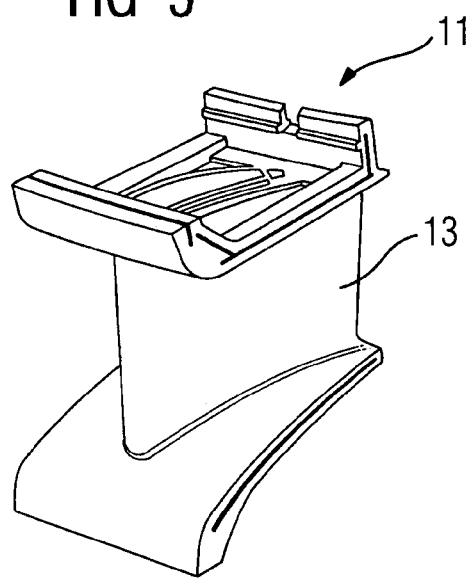
FIG. 5 shows a guide vane of the gas turbine in FIG. 1.

FIG. 1 shows a prior art gas turbine 1 which is designed for a high gas inlet temperature of around 1200° C. The gas turbine 1 has rotating blades 4 arranged on a rotor shaft 3 rotationally mounted in a housing 2. Provision is also made for guide vanes 11 connected in a rotationally fixed manner to the housing 2 (FIG. 4, FIG. 5). The rotating blades 4 and the guide vanes 11 are in particular respectively furnished with a surface coating 12, 13 in order to withstand the physical loadings in the duct 6 of the gas turbine 1. The coating is, for example "yttrium-stabilized zirconium oxide".

Figure 2:
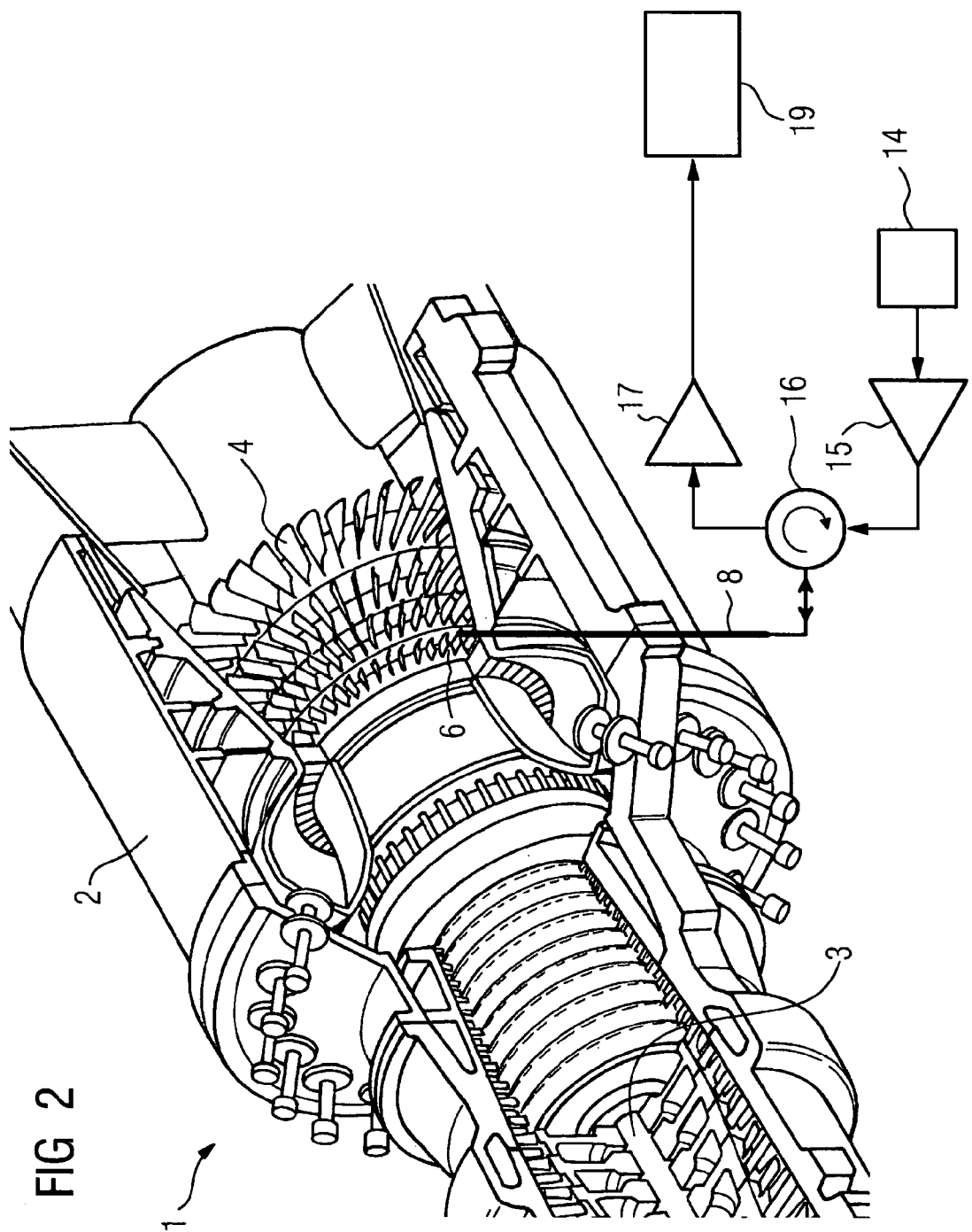
FIG. 2 shows an enlarged view of a section from the drawing in FIG. 1 comprising a device according to the invention.

As shown in FIG. 2, the turbine 1 is equipped with a device according to the invention which has an antenna 8, in particular an antenna fashioned for millimeter waves, which antenna extends into the duct 6 of the gas turbine 1. The antenna 8, which is provided in particular for electromagnetic waves with frequencies from 10 GHz to 130 GHz, is arranged in the area of the rotating blades 4 to be examined, in particular between two rows of rotating blades. The antenna 8 serves as a means for emitting electromagnetic waves and can also be used as a means for receiving electromagnetic waves. The antenna 8 is communicatively connected with a circulator 16. The device according to the invention also has a high-frequency generator 14 which is operatively connected via an amplifier 15 to the circulator 16. The circulator 16 is connected to a receiving amplifier 17 which is coupled to the evaluation unit 19 (FIG. 2).

In detail, the method for determining the temperature of a surface coating 12, 13 of rotating blades 4 and guide vanes 11 of the exemplary embodiment according to FIG. 3 proceeds as follows:

The electronic high-frequency generator 14 generates a high frequency with a fixed, predeterminable frequency which preferably lies in the range between 10 GHz and 130 GHz. The high frequency is fed to the amplifier 15 which for its part feeds the amplified high frequency via the circulator 16 to the antenna 8. The antenna 8 generates from the high-frequency energy supplied at least one corresponding electromagnetic wave 31 and emits this wave in accordance with its radiation pattern, preferably in a directed and in particular focused manner. The corresponding blade 4 (or 11) reflects a portion 32 of the emitted electromagnetic waves 31 back to the antenna 8. The reflected electromagnetic waves 32 are trans-formed via the antenna 8 again into an electrical signal which is fed to the circulator 16. The circulator 16 now separates the received signal from the transmitted signal and feeds this to the receiving amplifier 17. From the receiving amplifier 17 the signal goes to the evaluation unit 19 which in a first evaluation step records the intensity of the reflected electromagnetic wave 32 and associates it with the corresponding frequency.

These method steps are repeated with different frequencies until a spectral intensity distribution can be determined by the evaluation unit. FIG. 6 indicates three such spectral intensity distributions S1, S2 and S3, which were recorded at temperatures of 800° C. (S1), 600° C. (S2) and 400° C. (S3) of the surface coating 12, 13. The Y axis indicates the intensity of the reflected electromagnetic wave 32, while the frequency is plotted on the X axis. All three intensity distributions S1, S2 and S3 have differently distinguished intensity minima I1, I2 and I3, whereby the frequencies F1, F2 and F3 associated with the intensity minima I1, I2 and I3, the so-called resonance frequencies, also differ. The higher the temperature is, the greater is the intensity decrease at the minimum and the lower is the resonance frequency. The evaluation of an implemented series of measurement has yielded, for example, a temperature coefficient of the resonance frequency of 350 kHz/K and a temperature coefficient of the intensity decrease at the minimum of 0.03 dB/K. A characteristic temperature-dependency of the resonance frequency and of the intensity change at the minimum can be determined for each object to be examined.

In the evaluation unit 19, in a next evaluation step, the resonance frequency F1, F2 and F3 and/or the intensity of the minimum I1, I2 and I3 are determined and compared with the corresponding previously determined calibrating curves for the temperature-dependency of the resonance and/or of the intensity minimum. The temperature of the surface coating 12, 13 of the examined rotating blades 4 and/or guide vanes 11 can then be determined therefrom.

The temperature determined is forwarded via display units or indicator units (not shown in detail) to a monitoring point or to a control center. The evaluation unit can also be equipped with a comparison function by means of which the reaching of a predeterminable temperature threshold value can be ascertained. In this way, for example, when the threshold value is reached, a report can be output automatically that a temperature regulation in the turbine 1 should be carried out.

Figure 3:
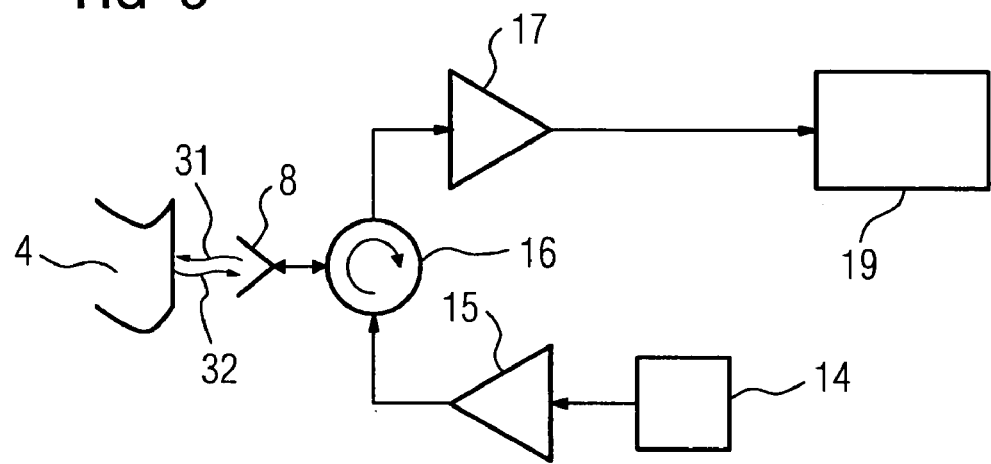
FIG. 3 shows a schematic diagram relating to execution of the inventive method.

Optionally, a mixer can be connected between receiving amplifier 17 and evaluation unit 19, which mixer is also connected to the high-frequency generator 14 so that, with the exemplary embodiment shown in FIGS. 2 and 3, in particular the principle of a Doppler radar can be used. This principle proves to be advantageous in particular for the examination of moving objects such as, for example, the examination of the rotating blades 4 of the gas turbine 1. Here, at least one electromagnetic wave 31 with a fixed wavelength is emitted which is reflected by an object to be examined (=rotating blade 4), moving relative to the antenna 8. The relative movement shifts the received wavelength in the reflected part 32 of the at least one electromagnetic wave compared with the emitted wavelength in accordance with the known physical effects, and the antenna 8 generates a corresponding signal which is given via the mixer to the evaluation unit 19 which determines from the properties of this signal (=frequency and/or spectral intensity distribution) the temperature of the surface coating 12 of the corresponding rotating blades 4.

The effect which leads to the reduction in the reflectivity of the surface coating 12, 13 at the resonance frequency F1, F2, F3 is primarily attributable to the fact that at the resonance frequency F1, F2, F3, i.e. at the minimum of reflectivity, the layer thickness of the surface coating 12, 13 corresponds to exactly ¼ of the associated wavelength of the reflecting electromagnetic wave 31, 32. In this case, the portions of the emitted electromagnetic wave 31 reflected at the surface of the surface coating 12, 13 and at the interface of surface coating 12, 13 and underlying metal obliterate one another at least in part. Due to the correlation between layer thickness of the surface coating 12, 13 and wavelength, further minima can be expected for frequencies at which the surface coating thickness corresponds to a product of wavelength and (¼+n/2), where n is a natural number. In principle, these minima could also be used for the method according to the invention. Both the temperature-dependent change in intensity of the minimum and the temperature-dependent change of the resonance frequency can be explained by a change in the dielectric constant and/or a change in the layer thickness of the surface coating 12, 13 as a function of the temperature of the surface coating 12, 13.

Figure 7:
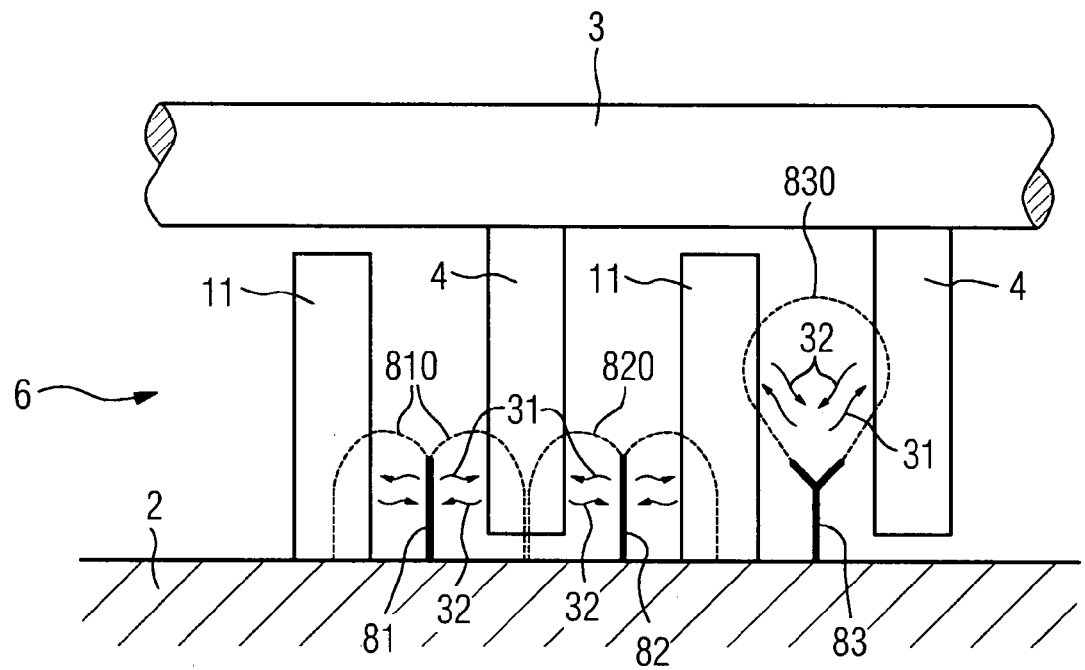

FIG. 7 shows exemplary embodiments and arrangements of various antennae 81, 82 and 83 with respectively associated radiation patterns 810, 820 and 830. The antennae 81, 82 and 83 are arranged in the duct 6 in the area of the rotating blades 4 and/or guide vanes 11 to be examined between the rows of blades. A design as a rod antenna or as a coaxial antenna, in particular as a coaxially designed dipole antenna, is suitable. Other forms of antennae such as, for example, horn antennae are, however, also conceivable. The radiation pattern can be fashioned symmetrically as in the case of the antennae 81 and 83 or else asymmetrically as in the case of the antenna 82. Besides antennae with a broad radiation characteristic, antennae can also be used which can emit the electromagnetic waves in a directed and furthermore also focused manner. In particular, the horn antennae cited, can be considered for this purpose.

The present invention must not be viewed as being restricted to the exemplary embodiment. Also falling within the scope of protection is the fact that multiple antennae for emitting and/or for receiving are also provided, in order, for example, to achieve a redundancy of measurement or also a higher accuracy.

In addition, the present invention provides for a simultaneous measurement of the temperature of the surface coating 12, 13 of cited blades 4 and 11.

The invention claimed is:

1. A method for determining the temperature of a surface coating of a component of a non-positive-displacement machine, comprising:
    arranging a plurality of blades inside a housing of the non-positive-displacement machine;
    emitting electromagnetic waves in a duct area of the blade by an electromagnetic wave generating device;
    reflecting at least partly the electromagnetic wave by at least a portion of the blades;
    receiving the reflected portions of the electromagnetic waves by a receiving device; and
    determining a temperature of a surface coating of the blades based on an intensity distribution of the received electromagnetic waves,
    wherein the electromagnetic waves are emitted with frequencies adapted to the thickness of the surface coating and the at least partially reflected portions of the reflected wave at least in part cancel one another.

2. The method as claimed in claim 1, wherein the blades are rotating blades or stationary blades of the machine.

3. The method as claimed in claim 2, wherein the stationary blades are guide vanes.

4. The method as claimed in claim 3, wherein the temperature of the surface coating of the rotating blades and the temperature of the surface coating of the guide vanes are determined.

5. The method as claimed in claim 4, wherein the received electromagnetic waves exhibit a decrease in intensity at a resonance frequency, and the intensity distribution is minimal at the resonance frequency.

6. The method as claimed in claim 5, wherein the temperature of the surface coating of the blades and vanes are determined from the value of the decrease in intensity.

7. The method as claimed in claim 6, wherein the temperature of the surface coating of the blade is determined from the value of the resonance frequency.

8. The method as claimed in claim 7, wherein the electromagnetic generating device is used for receiving the reflected electromagnetic waves.

9. The method as claimed in claim 8, wherein waves in the frequency range from 10 GHz to 130 GHz are used as electromagnetic waves.

10. A device for determining a surface coating temperature of a component of a non-positive displacement machine, comprising;
    an electric oscillation device that generates an electric oscillation;
    an electromagnetic wave generator that generates oscillating electromagnetic waves based on the electric oscillation wherein the frequencies of the electromagnetic oscillations are adapted to the thickness of the surface coating;
    a receiving device that receives the electromagnetic waves which cancel one another at least in part; and
    an evaluation unit that evaluates the receivable electromagnetic waves.

11. The device as claimed in claim 10, wherein the electromagnetic wave generating device is at least one antenna provided for millimeter waves.

12. The device as claimed in claim 11, wherein the electromagnetic waves are emitted by an antenna in a directed manner.

13. The device as claimed in claim 12, wherein the electromagnetic waves are emitted by an antenna in a focusable manner.

14. The device as claimed in claim 13, wherein the electromagnetic wave generating device is configured for transmitting and receiving electromagnetic waves.

15. The device as claimed in claim 14, wherein the electromagnetic wave generating device is arranged in a duct of the non-positive-displacement machine.

16. The device as claimed in claim 15, wherein the non-positive-displacement machine is a gas turbine or a steam turbine.

* * * * *